(12) United States Patent
Noble et al.

(10) Patent No.: US 11,242,145 B2
(45) Date of Patent: Feb. 8, 2022

(54) ARTIFICIAL INTELLIGENCE PLATFORM FOR MOBILE CHARGING OF RECHARGEABLE VEHICLES AND ROBOTIC DEVICES

(71) Applicant: AT&T Intellectual Property I, L.P., Atlanta, GA (US)

(72) Inventors: Eric Noble, Quartz Hill, CA (US); Di Chou, Colts Neck, NJ (US)

(73) Assignee: AT&T INIELLECTUAL PROPERTY I, L.P., Atlanta, GA (US)

( * ) Notice: Subject to any disclaimer, the term of this patent is extended or adjusted under 35 U.S.C. 154(b) by 222 days.

(21) Appl. No.: 16/283,606

(22) Filed: Feb. 22, 2019

(65) Prior Publication Data
US 2020/0269977 A1    Aug. 27, 2020

(51) Int. Cl.
B64C 39/02    (2006.01)
G08G 5/00    (2006.01)

(52) U.S. Cl.
CPC .......... B64C 39/024 (2013.01); G08G 5/006 (2013.01); G08G 5/0056 (2013.01); G08G 5/0069 (2013.01); G08G 5/0091 (2013.01); B64C 2201/042 (2013.01); B64C 2201/066 (2013.01)

(58) Field of Classification Search
CPC .......... B60L 53/60; B60L 53/62; B60L 53/64; B60L 53/65; B60L 53/66; B60L 53/68; G08G 1/01; G08G 1/02; G08G 1/04; G08G 1/042
See application file for complete search history.

(56) References Cited

U.S. PATENT DOCUMENTS

| | | | |
|---|---|---|---|
| 8,511,606 B1 | 8/2013 | Lutke et al. | |
| 9,545,852 B2 | 1/2017 | Streett | |
| 9,896,203 B1 | 2/2018 | Kim et al. | |
| 10,081,263 B2 | 9/2018 | Kim et al. | |
| 10,479,528 B1* | 11/2019 | Liang | G06Q 20/145 |
| 2005/0200479 A1* | 9/2005 | James | B60Q 1/52 340/539.18 |
| 2016/0196756 A1 | 7/2016 | Prakash et al. | |
| 2016/0325834 A1 | 11/2016 | Foster | |
| 2017/0047790 A1 | 2/2017 | Olsson et al. | |
| 2017/0075360 A1 | 3/2017 | Von Novak | |

(Continued)

FOREIGN PATENT DOCUMENTS

| WO | WO 2016/200021 | 9/2010 |
|---|---|---|
| WO | WO 2016/206089 | 12/2016 |
| WO | WO 2018/090493 | 5/2018 |

*Primary Examiner* — Thomas G Black
*Assistant Examiner* — Sara J Lewandroski
(74) *Attorney, Agent, or Firm* — Amin, Turocy & Watson, LLP

(57) ABSTRACT

Example methods, apparatus, systems, and machine-readable mediums for an artificial intelligence platform for mobile charging of rechargeable vehicles and robotic devices are disclosed. An example method may include determining that a mobile vehicle is operating within a region and determining that the mobile vehicle requires charging of a battery for the mobile device while operating within the region. The method may further comprise identifying a charging station available within the region for charging of the battery at a time and a location within the region and navigating at least one of the mobile vehicle or the charging station to the location at the time for charging the battery of the mobile vehicle.

19 Claims, 6 Drawing Sheets

(56) References Cited

U.S. PATENT DOCUMENTS

| | | | |
|---|---|---|---|
| 2017/0174093 A1* | 6/2017 | Oettle | G01S 13/0209 |
| 2018/0065494 A1* | 3/2018 | Mastrandrea | B60L 53/14 |
| 2018/0150072 A1* | 5/2018 | Boss | G08G 5/025 |
| 2018/0162555 A1 | 6/2018 | Lin | |
| 2018/0166916 A1 | 6/2018 | Lin | |
| 2018/0166917 A1 | 6/2018 | Lin | |
| 2018/0229852 A1 | 8/2018 | Boss et al. | |
| 2018/0293885 A1* | 10/2018 | Lee | G08G 1/0133 |
| 2020/0207230 A1* | 7/2020 | Evans | B60L 53/66 |
| 2020/0238847 A1* | 7/2020 | Wiseman | H02M 3/07 |
| 2020/0254892 A1* | 8/2020 | Hadi | B60L 53/16 |
| 2020/0262307 A1* | 8/2020 | Rosene | B60L 53/67 |
| 2020/0317084 A1* | 10/2020 | Schaffer | B60L 53/64 |

\* cited by examiner

ARTIFICIAL INTELLIGENCE PLATFORM FOR MOBILE CHARGING OF RECHARGEABLE VEHICLES AND ROBOTIC DEVICES

FIELD OF THE DISCLOSURE

This disclosure relates generally to charging of mobile robotic devices and vehicles and, more particularly, to providing an artificial intelligence platform that intelligently determines when, where, and how to recharge mobile vehicles, devices, and other systems.

BACKGROUND

Unmanned vehicles, also referred to more commonly as drones, may be mobile platforms capable of performing automated actions. Drones may provide many benefits over manned vehicles, including lower operating costs, fewer dangers of usage and/or travel, and increased accessibility to areas that may be dangerous for normal human travel. Moreover, drones may capture specific sensor data (e.g., audio, image, video, and/or other sensor data) at a target location, deliver goods (e.g., packages, medical supplies, food supplies, engineering materials, etc.) to the target location, handle objects (e.g., retrieving objects, operating equipment, repairing equipment, etc.) at the target location, and so forth without the need for a human to perform such actions. However, these drone devices require power to maintain functionality, which usually comes in the form of a rechargeable battery or other fuel source. For example, a drone delivering an item over a long range may be required to stop for recharging, which delays delivery time. This may be harmful where the drone is delivering time sensitive materials, such as human organs, perishable items, or important items that are required by a specific time. Similarly, robotics and electrical vehicles may require power while they are operating in order to prevent failure and inoperability that may inconvenience owners and operators of such devices and cause damages. Thus, additional time spent recharging or refueling can negatively impact operation of such devices.

SUMMARY

Using various embodiments, an artificial intelligence platform may be provided coordinating recharging of vehicles, robotic devices, drones, and other mobile systems by utilizing multiple different types of recharging stations or pods that are accessible over a network, for example, by a cellular network carrier. Traditionally, rechargeable vehicles, robotic devices, and other rechargeable devices are required to identify and travel to recharging stations, where the devices are required to be in a stationary state while recharging is completed. Owners and operators of such devices are required to identify these stations and/or establish a station of their own (e.g., such as a home or work location using a charger an owner has installed at such a location). In such cases, owners and operators of these devices are required to manually plan a charging schedule. Absent options available for charging, the devices run the risk of failure and inoperability. Moreover, weather conditions (e.g., wind, rain, etc.), payloads (e.g., items carried for delivery, sensors attached to the drones, etc.), and/or geographic conditions (e.g., landforms including hills, mountains, etc. that may affect battery power) may cause rechargeable devices to drain power at a faster rate and therefore become inoperable prior to an expected time. Thus, these devices run a large risk of inoperability without proper recharging and/or refueling options.

In order to provide recharging options, the platform controls coordinated recharging and controlling traffic of multiple charging pods that may be both stationary and mobile. The platform may onboard rechargeable vehicles, robotic devices, and other mobile systems through service level agreements and/or business assurance policies to provide a mobile charging platform to charge these devices during operation and/or when remote from one or more established charging locations for the devices. The platform may receive usage parameters and information for the devices, such as type of usage, payloads, charging needs and prioritization (e.g., whether the device is required to always maintain an operational state or more prioritized than other devices due to its operational nature), and other information. The platform may connect to and/or establish one or more charging stations or pods, where the pods may be stationary or mobile. These charging pods may provide charging to mobile systems through one or more of inductive charging, distant charging using infrared, distant charging using radio frequency, battery replacement, liquid metal battery refreshment, and/or magneto-based charging of a battery of the mobile systems. Thus, the platform may provide multi-mode remote and distant charging. The platform may also integrate with one or more data providers that may provide conditions and factors associated with operation of the mobile systems. This data may be used to determine predicted battery life, current battery levels, and/or other information that may affect where, when, and how to recharge the mobile systems. The information may be associated with the mobile systems and/or the charging pods, including one or more of locations, destinations, predicted and/or sensed battery life, emergency communications, scheduling of charging and/or travel, travel routes, prioritization, weather, mobile system/pod type, payloads, and/or other data. For example, the platform may integrate with a smart city system, emergency communication system, and/or other data resource to determine this information.

Thus, during operation of a mobile system or system, the platform may detect the mobile system as entering a state that requires recharging. For example, the platform may monitor the aforementioned data and determine that the mobile system will become inoperable prior to completing a task or during a particular task that would be adversely affected by the non-operation of the system. The recharging condition may be based on both the mobile system (e.g., the predicted battery life, present battery capacity, etc.) and the available recharging pods (e.g., locations, recharging schedules, etc.). The platform may then determine a recharging pod to assign to the mobile system at a time and a location for recharging of the mobile system. The platform may schedule the mobile system to be charged by the charging pod at that time and location. After scheduling, one or more of the mobile system or the charging pod may be navigated to this location at the time, for example, through navigation directions, executable instructions, or other data and process. The aforementioned communications may be performed over a cellular technology signal (e.g., 3G, 4G, 4G LTE, 5G, etc.) for the cellular network. The platform may cause the mobile system to be charged by the charging pod, which may include instructions to the charging pod to link to the mobile system and charge the system and/or through instruction to the mobile system of how to utilize charging provided by the charging pod. During particular emergencies, the platform may also readjust schedules and change charging instructions and navigations to accommodate those mobile systems that require charging for a higher prioritized task or system.

In one or more embodiments, a system for an artificial intelligence platform for mobile charging of rechargeable vehicles and robotic devices includes a non-transitory memory storing charging information for a plurality of charging stations managed by the system and one or more hardware processors configured to execute instructions to cause the system to perform operations comprising monitoring an operation of a first mobile system and detecting that the first mobile system requires charging of a rechargeable battery during the operation. The operations further comprise in response to the detecting, determining a first charging station of the plurality of charging stations to charge the rechargeable battery at a location and a time based on the operation of the first mobile system and the charging information, and assigning the first charging station to the first mobile system for charging the rechargeable battery at the location and the time.

In one or more embodiments, a method for operating an artificial intelligence platform for mobile charging of rechargeable vehicles and robotics includes determining that a mobile vehicle is operating within a region, determining that the mobile vehicle requires charging of a battery for the mobile device while operating within the region, identifying a charging station available within the region for charging of the battery at a time and a location within the region, and navigating at least one of the mobile vehicle or the charging station to the location at the time for charging the battery of the mobile vehicle.

In one or more embodiments, another system for managing a plurality of charging pods includes a non-transitory memory storing pod information for the plurality of charging pods and traffic information for an area of coverage of the plurality of charging pods for charging batteries of mobile systems operating in the area of coverage and one or more hardware processors configured to execute instructions to cause the system to perform operations comprising receiving battery power information for a mobile system and determining a time and a location to recharge the mobile system using one of the plurality of charging pods based on the battery power information and the pod information. The operations further comprise generating a travel route to cause the recharging of the mobile system using the one of the plurality of charging pods based on the time, the location, and the traffic information and causing the mobile system to be recharged by the one of the plurality of charging pods based on the travel route.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
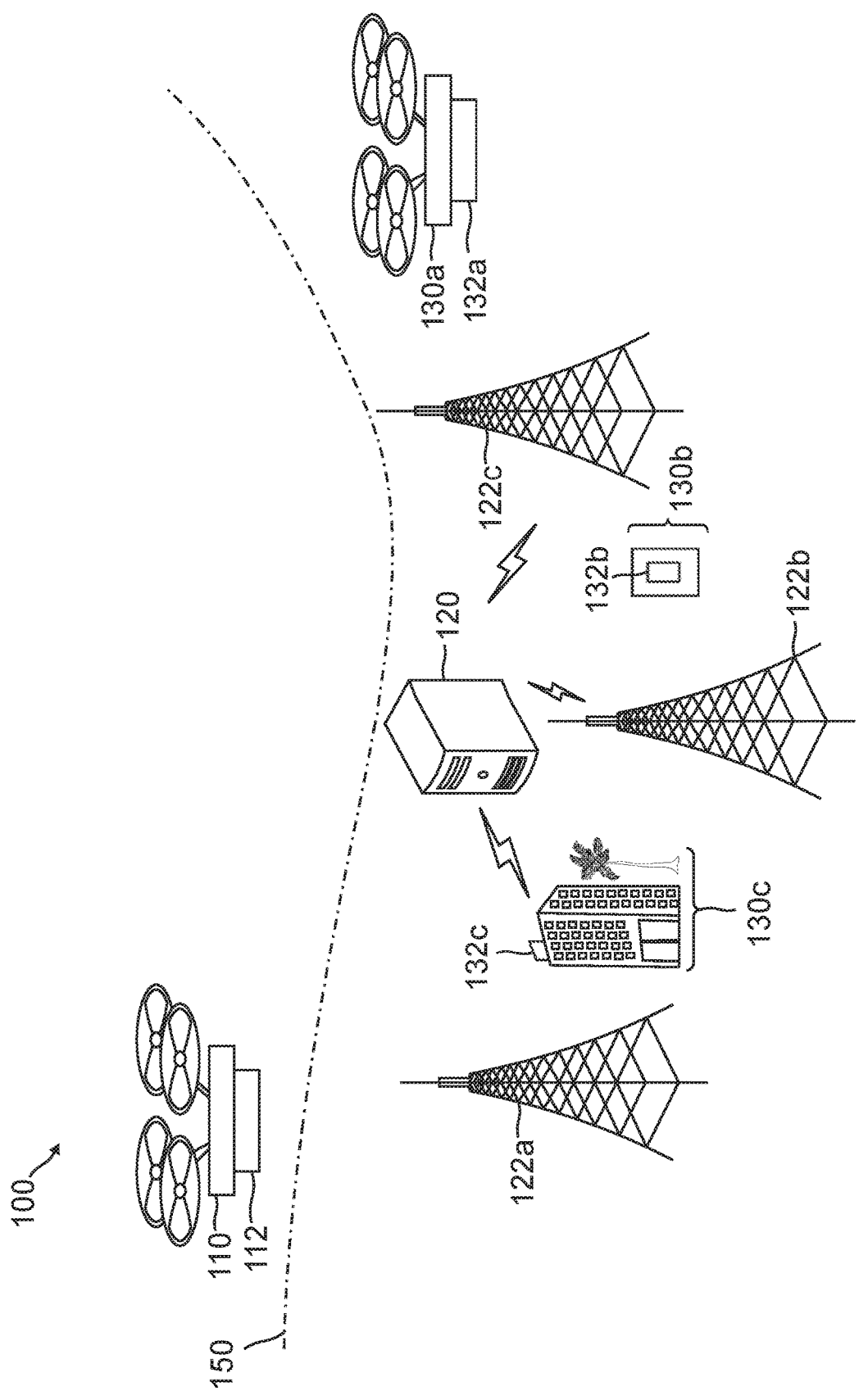
FIG. 1 illustrates an example of a network environment in which a platform for mobile charging of rechargeable vehicles and robotics is provided, according to an embodiment.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for an artificial intelligence platform for mobile charging of rechargeable vehicles and robotic devices. The platform may communicate with one or more mobile systems (e.g., drones, electric vehicles, and/or robots) and charging stations (e.g., stationary or mobile pods that provide charging) over a cellular network. The cellular network may be provided by a cellular network carrier or provider to facilitate communications between devices over the cellular network. Base stations of a cellular network are generally those base stations utilized with endpoints, which may include mobile systems as well as the charging pods discussed herein, at ground level and/or while the systems are operated at an altitude. In this regard, the base stations may be designed with antenna(s) having a main antenna pattern that encompasses a ground and aerial region utilized to communicate with these mobile through base stations and corresponding radio modules of the mobile systems, such as 3G, 4G, 4G Long Term Evolution (LTE), 5G, other $3^{rd}$ Generation Partnership Project (3GPP)-based radio modules, and/or other radio modules.

Due to the power constraints and limited power capabilities of rechargeable batteries for mobile systems, the platform may employ one or more charging stations or pods that provide multi-mode distant, remote, and/or mobile recharging to these mobile systems. The stationary pods and mobile pods may be equipped with a cellular radio that provides coverage within the cellular network. The network may include a wide area network (WAN), such as a cellular-based WAN. In the case of a cellular network, the communications may be provided as part of a broadcast message to the processing entity. For example, the information may be included in a master information block (MIB) message, system information block (SIB) message, Multimedia Broadcast Multicast Services (MBMS)-based message, Evolved MBMS (eMBMS)-based message, and/or generally any message that can be transmitted (e.g., broadcasted) to and from the base stations of the cellular network, mobile systems, and charging pods within receiving range of radio signals from the base stations.

The charging pods may correspond to stationary pods, which may be located at a specific location and restricted to that location, such as a landing pad, refueling station, or other type of charging station that allows for docking of a mobile system. For example, stationary and mobile pods may include an area or component having a physical latching mechanism, a magnetic coupling mechanism, a physical charging connection, or other physical attachment between the mobile system and the pod. In other embodiments, the stationary and/or mobile pods may provide for charging without a physical coupling mechanism, such as wireless charging through induction and/or distant charging using infrared (IR) or radio frequency (RF) signals. In this regard, a stationary pod may charge a mobile system that enters an area for the wireless charging and a mobile pod may charge by following, hovering above, below, or to the side of, or otherwise being near the mobile system to allow for wireless charging. Charging, battery refreshment, and/or battery replacement may be provided, for example, through a charging mechanism that includes one or more of inductive charging, distant charging using infrared, distant charging using radio frequency, battery replacement, liquid metal battery refreshment, and/or magneto-based charging of a battery of the mobile systems. The charging pods may include other components. For example, stationary pods may include parking spaces or landing pads and components for a user to connect to the charging components. Mobile pods may correspond to drones, manned or unmanned vehicles, and/or other types of mobile systems that may include a payload that provides charging to other mobile systems. In order to accommodate travel and charging, the mobile systems may include additional components, such as solar charging capabilities. Additionally, the drones may be equipped with collision sensors for flying autonomously in order to prevent collisions with certain objects.

In order to provide intelligent traffic control and charging resource allocation, the platform may integrate or communicate with one or more data detection systems, such as a smart city system and/or an emergency communication and scheduling system. A smart city system may provide data sensors and device communications that may detect parameters and conditions within an area that a mobile device having a limited capacity rechargeable battery operates. The smart city system may determine traffic and traffic patterns, weather (e.g., wind, rain, sun, etc.), city geographic conditions, and other data of the area that the mobile system is operating in. An emergency communication system may provide integration with a system that sends and receives emergency communications, such as those during disasters, weather storms or issues, medical procedures and/or conditions, accidents, and other information that may be used to determine traffic or operating conditions and prioritize usage of charging pods with mobile systems. Other types of system integrations may also be used to provide other information to the platform, including weather, traffic, payloads, battery information, mobile system usage, emergency communications, or other information. The information may be provided in real-time to allow the platform to make decisions for allocation of charging pods to mobile systems that require charging.

During operation of a mobile system, data may therefore be monitored and detected of the mobile system and environment in which the mobile system operates to determine whether the mobile system requires charging of a rechargeable battery to continue operation or for a planned operation. When determining whether a device requires recharging, information used to determine a present battery level (e.g., a held charge and remaining power capability of the battery) may be determined. For example, a present battery level may be sensed or determined through usage of the mobile system. Battery consumption information may be determined based on factors such as a payload of the mobile system, a travel route or destination, and other information. Additional information used to determine a predicted battery life or remaining battery power/time may be processed as well, such as weather, travel conditions, geographic conditions, traffic, etc. The platform may utilize the aforementioned information to assign one or more charging pods to the mobile system. The pod(s) selected may be based on pod information, such as a location of a pod, the pod's schedule, charging components and resources of the pod, and other information. In some embodiments, the mobile system may select from a plurality of pods. However, in other embodiments, a "best" or most compatible charging pod (e.g., based on location, priority, battery and charging resources/parameters, etc.) may be determined and assigned to the mobile system. The platform may also determine a time and a location for the charging, which may be a static location of a stationary pod or may be a dynamic location that may be altered for a mobile pod.

The platform may then cause or instruct the charging pod to charge the mobile system, for example, by navigating a mobile system to a stationary pod or by navigating the mobile system and a mobile pod to a particular meeting location for the charging, such as through navigation instructions sent to the mobile system. In some embodiments with the mobile pod, the location may be dynamic and a route that changes as the mobile pod continues to charge the mobile system during operation of the mobile system (e.g., along a travel route). The location and the time for charging may be intelligently determined using optimizer algorithms, service level agreements for the mobile systems, business assurance policies of the platform, schedules for the charging pods, costs for using the charging pods to charge the mobile system (e.g., selecting a least costly charging pod), and/or other information. Once determined, travel route information and/or executable instructions (e.g., code for processes executable by the mobile system and/or charging pod) may be generated by the platform and transmitted to the mobile system and/or charging pod. Additionally, the platform may provide instructions and processes for coupling and charging at the location and time. In some embodiments, during navigation of the mobile system or the charging pod to the other, the platform may determine that an emergency condition or communication indicates that the pod is required to be allocated to some emergency or another mobile system. In such embodiments, the platform may end the navigation to cause the mobile system to be charged, and may determine a new charging pod for the mobile system as described above.

Although the description of the present disclosure is made with respect to drones, mobile systems, and cellular networks, the techniques described herein may be applied to any wireless networks and any devices/vehicles capable of establishing connectivity in such wireless networks. By way of non-limiting example, the devices/vehicles may include, or may be included in, devices or vehicles at or near ground level (e.g., mobile devices, cars), naval-based devices (e.g., watercraft), and devices at higher altitudes (e.g., drones, any device at higher altitudes). In this regard, the techniques described herein may be utilized for devices located at higher altitudes, such as mobile phones, vending machines, set-top boxes, and/or other devices/vehicles operated at higher floors of a building.

FIG. 1 illustrates an example network environment 100 in which a system for an artificial intelligence platform for mobile charging of rechargeable vehicles and robotics may be implemented in accordance with one or more embodiments. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. However, in some examples, the network environment 100 may be additionally or alternatively implemented to form part of a satellite communication network, microwave radio network, and/or other wireless networks.

The network environment 100 includes a mobile system 110, a recharging coordinator platform 120, base stations 122a-c, and charging pods 130a-c. Mobile system 110, recharging coordinator platform 120, base stations 122a-c, and charging pods 120a-c may be in communication directly or indirectly with each other. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

Mobile system 110 may include, may be a component of, and/or may be referred to as, a manned or unmanned vehicle, a robotic device, or a mobile user endpoint or UE. Mobile system 110 may include an operation control unit, communication unit, and payload unit. The operation control unit or other operation module of mobile system 110 may be configured to facilitate navigation of mobile system 110, e.g., driving, take off, landing, and flight of mobile system 110. Such an operation module may include any appropriate avionics, control actuators, and/or other equipment, along with associated logic, circuitry, interfaces, memory, and/or code. The operation control unit may utilize a battery 112 for power to mobile system 110, which may be rechargeable to extend operation of mobile system 110 during use. Battery 112 may correspond to a lithium-ion, lithium polymer, or other type of battery rechargeable utilizing wired or wireless charging processes, or may correspond to other types of batteries, such as liquid batteries (e.g., lead acid batteries) that may be charged through liquid battery refreshment. Additionally, the operation control unit or other operation module may include a controller that receives flight route information from one or more sources, including a memory and/or external controller (e.g., set instructions from a service provider and/or inflight navigation/instructions from an operator) that operates mobile system 110. In some embodiments, mobile system 110 may instead correspond to a mobile phone, a personal digital assistant (PDA), a tablet device, a computer, or generally any device that is operable to communicate wirelessly (e.g., via cellular standards using antennas) with other devices, recharging coordinator platform 120, and/or one or more of base stations 122a-c.

The communication unit may include one or more radio transceivers (e.g., that include antennas) along with associated logic, circuitry, interfaces, memory, and/or code that enable communications, e.g. with one or more of base stations 122a-c, and/or directly with recharging coordinator platform 120, via wireless interfaces and using the radio transceivers. In FIG. 1, the radio transceivers of mobile system 110 include an antenna. The antenna may be utilized to radiate and/or receive power uniformly in all directions, or one or more desired directions to allow increased performance (e.g., higher signal strength) in the desired direction, such as through higher gain and directivity and reduced interference due to signals from sources deviating from the desired direction. The antenna may be contained within a housing of mobile system 110 (e.g., embedded within the housing and/or circuitry of mobile system 110), or disposed (e.g., mounted) outside a housing of mobile system 110 as an attachable and/or removable module. The antenna may correspond to a cellular technology radio unit, which uses the cellular radio coverage of the cellular network.

In some cases, the communication unit of mobile system 110 may include suitable logic, circuitry, interfaces, memory, and/or code that enable wired communications, e.g. with one or more of base stations 122a-c, and/or recharging coordinator platform 120 directly. In this regard, mobile system 110 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, mobile system 110 may utilize wired connections when at or near ground level. In other embodiments, the communication unit may send and/or receive information over a cellular technology signal/network (e.g., 3G, 4G, 5G, and/or other 3GPP-based cellular network) to one or more of base stations 122a-c. Thus, mobile system 110 may wirelessly communicate with other devices using wireless standards, such as the Institute of Electrical and Electronics Engineers (IEEE) 802.11 standard, Bluetooth® standard, ZigBee® standard, and/or other wireless standards; cellular standards, such as 3G, 4G, 4G LTE, 5G, and/or other cellular standards; infrared-based communication; optical-based communications; and/or other appropriate communication standards and/or protocols. In some cases, mobile system 110 may be configured to communicate with another device using a proprietary wireless communication protocol and interface.

The payload unit may be configured to implement features supported by mobile system 110 and facilitate implementation of such features. The payload unit may include any equipment and associated logic, circuitry, interfaces, memory, and/or code. The payload unit may include a global positioning system (GPS) that provides a current position of mobile system 110 (e.g., using three coordinates). Depending on an application(s) of mobile system 110, the payload unit may include one or more onboard sensors. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras); acoustic sensors, and/or other types of sensors, or combination thereof. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g. the object may be secured within a housing of mobile system 110. Payload unit may also contain necessary rechargeable power sources, including a rechargeable solar battery and associated solar charging panel or photovoltaic charging source.

Charging pods 130a-c may correspond to charging stations or devices that provide electrical and/or chemical recharging to mobile systems, such as mobile system 110 during operation of the mobile systems so that mobile and distant charging of the systems may be performed while the systems are remote from their known charging stations. Charging pods 130a-c include suitable logic, circuitry, interfaces, memory, and/or code to enable recharging of mobile systems based on received instructions and coordinated recharging by recharging coordinator platform 120. In this regard, charging pods 130a-c may include at least rechargers 132a-c, where rechargers 132a-c correspond to components, processes, and features to provide charging of battery 112 for mobile system 110. For example, rechargers 132a-c may be capable of providing power to battery 112 to recharge battery 112 through one or more of inductive charging, distant charging using infrared, distant charging using radio frequency, battery replacement, liquid metal battery refreshment, and/or magneto-based charging. Thus, charging pods 130a-c may provide multi-mode mobile charging for mobile systems. Charging pods 130a-c and/or rechargers 132a-c may include coupling mechanisms necessary to provide recharging of battery 112, which may include wired or wireless coupling. In other embodiments where wireless charging is performed, charging pods 130a-c may include processes and components to detect a location, direction of travel, and/or other information necessary to provide wireless recharging for mobile system 110.

In some embodiments, charging pods 130a-c may also include an operation control unit, a communication unit, and/or other components used for receiving and executing instructions to recharge battery 112 of mobile system 110. The instructions may include information necessary to identify mobile system 110, a time for charging mobile system 110, and/or a location for charging, including a geo-location or a subset location of charging pods 130a-c where charging pods 130a-c may be capable of charging multiple systems at a time. For example, an operation control unit and a communication unit may function in coordination to receive communications from base stations 122a-c that instruct charging pods 130a-c to provide recharging features to mobile system 110. The instructions may include when and how to charge mobile system 110, and may further include a location for mobile system 110 to meet a mobile pod, such as charging pod 130c. Charging pod 130c may correspond to a similar drone, vehicle, or mobile system as described in reference to mobile system 110. For example, charging pod 130c may similarly include an operation control unit, a communication unit, and a payload unit, as discussed in reference to mobile system 110. Thus, charging pod 130c may include components necessary for operation of charging pod 130c during movement. Charging pod 130c may include a payload unit configured to similarly contain a payload. In some embodiments, the payload may also include components for charging or replacing batteries, including solar chargers, reserve batteries, replacement batteries, and/or liquid refreshment resources. Additionally, charging pod 130c may further include a recharger 130c as discussed above, which may be a portion of, included within, or separate from the payload unit.

Although a single mobile system and three charging pods (e.g., mobile system 110 and charging pods 120a-c) are shown in FIG. 1, multiple mobile systems and charging pods may be utilized and function similarly.

One or more of base stations 122a-c may include, may be a component of, and/or may be referred to as, a cell, a Node B (NB), an Evolved Node B (eNodeB or eNB), or a Home eNB (HeNB). One or more of base stations 122a-c include suitable logic, circuitry, interfaces, memory, and/or code that enable communications with mobile system 110, charging pods 120a-c, one of the other base stations 122a-c, and/or recharging coordinator platform 120, via wireless interfaces and utilizing one or more radio transceivers (e.g., that include antennas). In an aspect, base stations 122a-c may transmit (e.g., broadcast) messages that, if received by mobile system 110 and/or charging pods 130a-c, facilitate use, navigation, and/or charging between mobile system 110 and charging pods 130a-c. In some cases, the messages transmitted by base stations 122a-c may be based on information that base stations 122a-c receive from recharging coordinator platform 120. In some cases, one or more of base stations 122a-c may be mobile (e.g., mobile base stations at ground level, mobile base stations at flight altitudes, mobile naval-based base stations, etc.), in which case its position information is dynamic.

Base stations 122a-c may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, base stations 122a-c have nominal coverage areas. The coverage area of a base station may be different in different environments, at different altitudes, and at different frequency bands. For example, a base station may have a smaller coverage area on a rainy day than the same base station on a sunny day, e.g. due to attenuation of signals by rain. When altitudes are taken into consideration, the coverage area provided by base stations 122a-c may more appropriately be referred to as a coverage volume, with different coverage areas at different altitudes. As used herein, the coverage area and coverage volume may be referred to more generally as a coverage region, where the region may be two-dimensional (e.g., coverage area) or three-dimensional (e.g., coverage volume).

Recharging coordinator platform 120 may be, may include, and/or may be a component of, a core network for processing information from drones and other mobile systems (e.g., mobile system 110), charging stations or pods (e.g., charging pods 120*a-c*), and/or base stations (e.g., base stations 122*a-c*) and managing charging of these mobile systems and charging pods. For example, recharging coordinator platform 120 may be, may include, and/or may be in communication with a mobile telephone switching office (MTSO). Recharging coordinator platform 120 and base stations 122*a-c* may be provided by a cellular network carrier or provider. Recharging coordinator platform 120 includes suitable logic, circuitry, interfaces, memory, and/or code that enables communications, e.g. with one or more of base stations 122*a-c* and/or one or more endpoints (e.g., mobile system 110 and charging pods 120*a-c*), via wireless interfaces and utilize one or more radio transceivers. In this regard, recharging coordinator platform 120 may be dedicated to facilitate connectivity of drones (or other vehicles/devices) and charging pods with base stations 122*a-c* (and/or other base stations).

In an aspect, recharging coordinator platform 120 may be, may include, or may be a part of, a server (e.g., a centralized server) that can generate and distribute information to base stations 122*a-c*, as well as receive information from base stations 122*a-c*. Base stations 122*a-c* may then relay the information from recharging coordinator platform 120 to mobile system 110 and/or charging pods 120*a-c*. Base stations 122*a-c* may be in communication with recharging coordinator platform 120 through a backhaul network. Recharging coordinator platform 120 may be in direct communication with one or more of base stations 122*a-c* or in communication with one or more of base stations 122*a-c* through one or more intermediary base stations. For example, in FIG. 1, recharging coordinator platform 120 is in direct communication with base stations 122*a-c*. In other cases, a base station may be in communication with recharging coordinator platform 120 via one or more intervening base stations. In some cases, recharging coordinator platform 120 may determine preferred frequency bands to be utilized at various altitudes based on the signal strength statistics.

The travel route 150 may be a portion of a flight path or other route along which mobile system 110 is moving or intends to move in going from a starting point to a destination point. Travel route 150 may be defined by a set of positions and locations where mobile system 110 is located, has been located, or is expected to be located. The positions may each be associated with a set of three-dimensional coordinates (e.g., longitude, latitude, altitude). For example, during use of mobile system 110 to deliver an item, the starting point may be a warehouse or takeoff point at which mobile system 110 is provided with the travel route for execution. The destination point may therefore be the endpoint where mobile system 110 drops off the package and/or lands for delivery of the package, where mobile system 110 travels from the starting point to the destination point using travel route 150.

However, during operation along travel route 150, mobile system 110 may require recharging of a battery or other fuel source in order to complete travel along travel route 150 and/or make a return trip. For example, battery 112 may not have enough remaining battery charge or power to complete travel route 150. This may be due to the length of travel route 150 and/or conditions affecting travel on travel route 150 (e.g., weather, traffic, etc.). Thus, recharging coordinator platform 120 may utilize charging pods 130*a-c* to provide recharging of mobile system 110 while mobile system 110 is in operation, which may include mobile and/or remote charging of mobile system 110. Recharging coordinator platform 120 may utilize base stations 122*a-c* to communicate with mobile system 110 and/or charging pods 130*a-c* to provide instructions for completing charging. Additionally, recharging coordinator platform 120 may utilize system integrations with one or more data detection systems to determine scheduling for charging pods 130*a-c* and recharging of mobile system 110. The specific processes, features, and components to provide intelligent mobile charging for mobile system 110 through recharging coordinator platform 120 and charging pods 130*a-c* are discussed in more detail below with regard to FIGS. 2-5.

Although FIG. 1 is described with respect to mobile system 110, the endpoint may generally be any device, e.g. at ground level or at higher altitudes, that requires charging while in operation and/or in a mobile state (e.g., away from a designated charging location). Although mobile system 110 is depicted as including a single battery, in some cases mobile system 110 may have more and/or different batteries than those shown in FIG. 1. In addition, FIG. 1 illustrates one example of a network configuration. Other network configurations may be utilized to allow communication between mobile system 110, recharging coordinator platform 120, base stations 122*a-c*, and charging pods 120*a-c*. The network environment 100 may include a different number of drones, user devices, base stations, and/or network management systems than that shown in FIG. 1.

Figure 2:
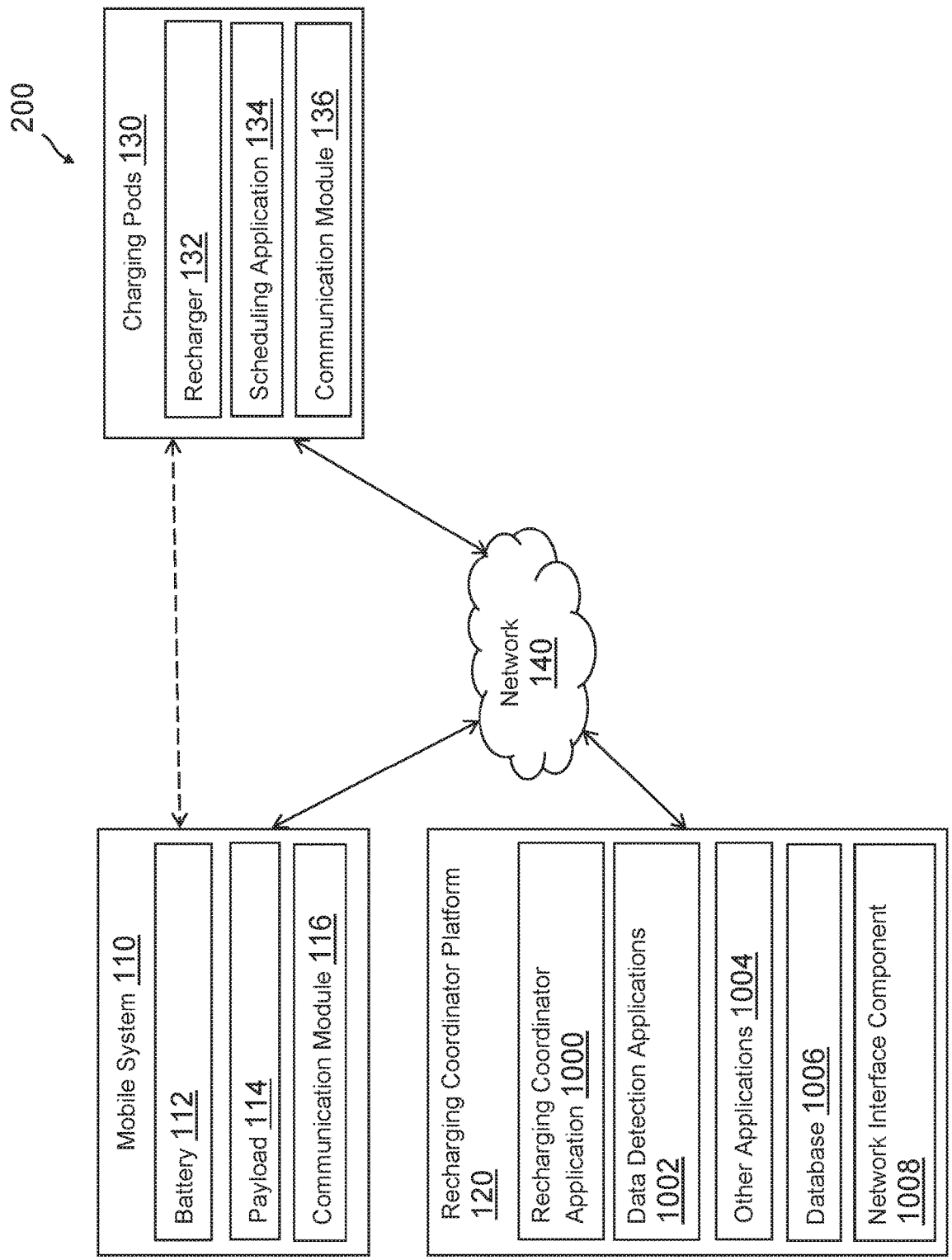
FIG. 2 illustrates a block diagram of a platform in communication with a mobile system and a charging pod to provide mobile recharging, according to an embodiment.

FIG. 2 illustrates a block diagram of a platform in communication with a mobile system and a charging pod to provide mobile recharging, according to an embodiment. System 200 includes mobile system 110, recharging coordinator platform 120, and charging pods 130 in communication over a network 140. Mobile system 110, recharging coordinator platform 120, and charging pods 130 are discussed in reference to network environment 100 of FIG. 1. In this regard, recharging coordinator platform 120 may instruct mobile system 110 and/or charging pods 130 to charge battery 112 of mobile system 110 as required during operation of mobile system 110. Mobile system 110, recharging coordinator platform 120, and charging pods 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 140.

Mobile system 110 may be implemented as a drone, electric vehicle, robotic, or other system that may utilize appropriate hardware and software configured for wired and/or wireless communication with recharging coordinator platform 120. Although only one mobile system is shown, a plurality of mobile systems may function similarly Mobile system 110 of FIG. 2 contains a battery 112, a payload 114, and a communication module 116. In some embodiments, mobile system 110 may include additional or different modules having specialized hardware and/or software as required, such as a flight controller and/or navigation component or unit Battery 112 of mobile system 110 may correspond to a rechargeable battery used to power one or components of mobile system 110 in order to provide features, such as operation of mobile system 110 (e.g., driving, flying, or otherwise utilizing mobile system 110 to travel between two or more points). Battery 112 may correspond to a Lithium-ion(Li-ion), Nickel Cadmium(Ni—Cd), Nickel-Metal Hydride(Ni—MH), Lead-Acid, or other type of battery that may hold an electrical charge and may be utilized to provide power to components of mobile system 110. Battery 112 may be depleted during operation of mobile system 110 and may therefore be recharged utilizing charging pods 130. Thus, battery 112 may be recharged during operation of mobile system 110 (e.g., while traveling between two points) or may be charged remotely from a charging location by charging pods 130 between uses of mobile system 110. Battery 112 may also be associated with one or more charging and/or attachment components, such as plugs, ports, or other components used to connect with charging pods 130 and receive charging of battery 112 from charging pods 130.

Mobile system 110 further includes a payload 114 and at least one communication module 116 adapted to communicate with recharging coordinator platform 120. Payload 114 may correspond to a component that may accept a payload that is used and/or transported during operation of mobile system 110. For example, payload may correspond to sensors, components, and/or devices that may be utilized during operation of mobile system 110. In other embodiments, payload 114 may correspond to an item delivered by mobile system 110. In various embodiments, communication module 116 may include a DSL (e.g., Digital Subscriber Line) modem, a PSTN (Public Switched Telephone Network) modem, an Ethernet device, a cellular technology signal/network device (e.g., 3G, 4G, 5G, and/or other 3GPP-based cellular network), other a broadband device, a satellite device and/or various other types of wired and/or wireless network communication devices including microwave, radio frequency, infrared, Bluetooth, and near field communication devices.

Recharging coordinator platform 120 may be maintained, for example, by a mobile multi-mode charging service provider, which may be provided by a mobile services carrier, telecommunication provider, or other cellular network providing entity that provides one or more networks for use by users through one or more devices. In this regard, recharging coordinator platform 120 includes one or more processing applications which may be configured to interact with mobile system 110 to facilitate charging of mobile system 110. Although recharging coordinator platform 120 is described as being provided by a telecommunication entity, in other embodiments, recharging coordinator platform 120 may be maintained by or include other types of service provider providing charging services to mobile systems.

Recharging coordinator platform 120 of FIG. 2 includes a recharging coordinator application 1000, data detection applications 1002, other applications 1004, a database 1006, and a network interface component 1008. Recharging coordinator application 1000, data detection applications 1002, and other applications 144 may correspond to executable processes, procedures, and/or applications with associated hardware. In other embodiments, recharging coordinator platform 120 may include additional or different modules having specialized hardware and/or software as required.

Recharging coordinator application 1000 may correspond to one or more processes to execute modules and associated specialized hardware of recharging coordinator platform 120 to determine one or more mobile systems requires charging and manage charging of the mobile systems through charging pods 130. In this regard, recharging coordinator application 1000 may correspond to specialized hardware and/or software to first receive information indicating that mobile system 110 requires charging. For example, recharging coordinator application 1000 may receive information for a current battery level of battery 112 of mobile system 110, such as a level, remaining charge capacity, or other battery condition and charge information. Recharging coordinator application 1000 may also receive information used to determine a predicted battery life of battery 112, such as a predicted remaining time until battery depletion and/or rate of battery depletion. For example, recharging coordinator application 1000 may receive information indicative of a location of mobile system 110, a destination of mobile system 110, a travel route between the location, a starting location, and/or the destination, a remotely sensed battery life, weather encountered or expected to be encountered by mobile system 110, a drone or vehicle type for mobile system 110, a payload of mobile system 110, and/or other information. In order to receive this information, recharging coordinator application 1000 may interface with data detection applications 1002 that may be integrated with one or more systems used to detect the aforementioned data.

Recharging coordinator application 1000 may also receive information for charging pods 130 that may be used to schedule charging pods 130 for charging of one or more mobile systems, including mobile system 110. For example, recharging coordinator application 1000 may interface with data detection applications 1002 to determine locations, schedules for available charging resources and processes, emergency communications, priority of charging pods 130, business assurance policies and service level agreements, and other information. Recharging coordinator application 1000 may schedule charging for mobile system 110 and additional mobile systems based on the data received by recharging coordinator application 1000, which may include times, locations, and/or mechanisms for charging the mobile systems. The schedule may therefore designate one or more of charging pods 130 to charge a mobile system, such as mobile system 110. The schedule may include a time for charging mobile system 110 and a length for charging mobile system 110 by the selected one of charging pods 130. Where the selected one of charging pods 130 is a stationary charging pod, a location of the stationary pod may be provided to mobile system 110, as well as a travel route to the location. However, if the selected pod is a mobile charging pod, a location of mobile system 110 may be provided to the mobile pod, including an expected location at a future time. This may be detected using a GPS component of mobile system 110 or other location detection system. A travel route to the location may also be provided with instructions for the mobile pod to execute to charge mobile system 130. A meeting location and time may also be determined for mobile system 110 and the mobile pod, which may be provided to both systems to meet at the time and receive charging services. Recharging coordinator application 1000 may further utilize an optimizer algorithm and process to optimize use of charging pods 130 for charging In various embodiments, recharging coordinator application 1000 may include one or more modules for fleet management and/or management of charging pods 130, such as scheduling of charging pods 130 to one or more mobile systems for charging of those mobile systems. For example, the fleet management module and associated components may coordinate activities of charging pods 130 necessary for charging of mobile systems. The fleet management module may provide route mapping for charging pods 130, which may be used to avoid collision and properly charge mobile systems, including priority ranking of mobile systems for charging. The fleet management module may therefore determine multiple routes for charging pods 130. Recharging coordinator application 1000 may also receive emergency communications that may be used to reschedule charging pods 130, such as a disaster or accident communication, required priority charging based on medical issues or procedures, and other types of emergency communications. In response to an emergency communication, recharging coordinator application 1000 may divert one or more of charging pods 130 to assist with the emergency, for example, by prioritizing the mobile system that requires recharging for the emergency over other mobile systems and revising a charging schedule for charging pods 130.

Data detection applications 1002 may correspond to one or more processes to execute modules and associated specialized hardware of recharging coordinator platform 120 to detect and/or receive information used to determine schedule). In this regard, recharging coordinator application 1000 may correspond to specialized hardware and/or software to receive the information, either in real-time over a stream of data from one or more sensors and/or data detectors. The data may include one or more of a location of mobile system 110, other mobile systems, and/or charging pods 130, destinations and travel routes of these devices and systems, a remotely sensed battery life, a predicted battery life, charging resources and changing compatibilities for these devices and systems, emergency communications, schedules for charging pods 130, priority of these devices and systems including business assurance policies and/or service level agreements, weather over a geographic area or location, the layout of the geographic area (e.g., trees, hills, and other objects that must be navigated), traffic encountered by these devices and systems, a device/system type, payload of mobile system 110, and/or other data necessary to perform charging scheduling.

Data detection applications 1002 may integrate with one or more systems and/or sensors in order to detect this data. For example, integration with a smart city system that provides detection of conditions, parameters, and information over an area may provide information such as traffic, weather, and/or conditions within a city or other geographic area. The smart city system may provide data to data detection applications 1002 as it is detected over an area. Data detection applications 1002 may also integrate with an emergency response system, such as FirstNet™ or other emergency response system (e.g., a 5G or other emergency wireless network that may be used to send and received emergency communications). The emergency response system may provide a network that is dedicated to emergency communications to provide sufficient bandwidth for data transfer, and an application programming interface (API) of the network may expose activity and communications on the emergency network. Recharging coordinator platform 120 may then detect an emergency through data detection applications 1002, such as a tornado or a medical operation (e.g., donation of an organ) that requires emergency relief through a drone or other mobile system. Data detection application 1002 may then determine connections between devices and mobile systems and may assign charging pods 130 to the mobile systems requiring charging during the emergency. Recharging coordinator platform 120 may determine how the emergency may affect battery usage and expected life (e.g., based on weather, speed of operation of the rechargeable mobile system, etc.). One or more of charging pods 130 may be assigned to the emergency so that the emergency may be monitored and mobile systems attending to the emergency may be prioritized for recharging by recharging coordinator platform 120.

In various embodiments, recharging coordinator platform 120 includes other applications 1004 as may be desired in particular embodiments to provide features to recharging coordinator platform 120. For example, other applications 1004 may include security applications for implementing server-side security features, programmatic applications for interfacing with appropriate application programming interfaces (APIs) over network 140, or other types of applications. Other applications 144 may contain software programs, executable by a processor, including a graphical user interface (GUI), configured to provide an interface to the user when accessing recharging coordinator platform 120. Other applications 1004 may also provide applications used to schedule charging pods 130 for charging. In various embodiments, other applications 1004 may include connection and/or communication applications, which may be utilized to communicate information over network 140.

Additionally, recharging coordinator platform 120 includes database 1006. As previously discussed, data detection applications 1002 may determine data necessary to detect that mobile system 110 requires charging and schedule one or more of charging pods 130 with mobile system 110 for charging, which may be stored to database 1006. Additionally, database 1006 may further include scheduling information for charging pods 130, such as where, when, and how charging pods 130 may charge one or more mobile systems. Database 1006 may receive communications necessary for scheduling charging pods 130, including emergency communications that cause rescheduling and diverting of charging pods 130 to mobile systems requiring charging. Database 1006 may also store travel routes determined by recharging coordinator application 1000 for use in directing mobile system 110 and/or charging pods 130 to each other in order to effectuate charging of battery 112 by charging pods 130. These travel routes may also be utilized for scheduling of charging pods 130 with additional mobile systems.

In various embodiments, recharging coordinator platform 120 includes at least one network interface component 1008 adapted to communicate with mobile system 110 and/or charging pods 130 over network 140. In various embodiments, network interface component 1008 may include a DSL (e.g., Digital Subscriber Line) modem, a PSTN (Public Switched Telephone Network) modem, an Ethernet device, a cellular technology signal/network device (e.g., 3G, 4G, 5G, and/or other 3GPP-based cellular network), other a broadband device, a satellite device and/or various other types of wired and/or wireless network communication devices including microwave, radio frequency, infrared, Bluetooth, and near field communication devices.

Charging pods 130 may be implemented as stationary and/or mobile charging stations, locations, and/or devices that may provide recharging resources to mobile systems. Stationary pods of charging pods 130 may correspond to a location where a mobile system may be charged by arriving at, docking to, and/or being located nearby. For example, a stationary charging pod may correspond to a station that may be visited, which may be single use that provides charging for one system at a time, or may have capacity to charge multiple systems at a time.

A stationary pod may be provided within or on another object or location, such as a roof mounted charging pod on a building. A mobile charging pod may be implemented as a drone, electric vehicle, robotic device, or other system that may provide charging at locations of mobile systems and/or while a mobile system is in operation over an area. Thus, mobile pods may be manned or unmanned and capable of travelling over an area, such as a long range drone or vehicle that may be powered and include additional charging resources or fuel. Mobile pods may be controlled by recharging coordinator platform 120 and instructed to travel to a mobile system for charging. Charging pods 130 of FIG. 2 contains a recharger 132, a scheduling application 134, and a communication module 138. In some embodiments, mobile system 110 may include additional or different modules having specialized hardware and/or software as required, such as a flight controller and/or navigation component or unit.

Recharger 132 may correspond to a charging component that may provide resources to charge battery 112 of mobile system 110, such as a charger, refresher, and/or replacement battery for a Lithium-ion(Li-ion), Nickel Cadmium(Ni—Cd), Nickel-Metal Hydride(Ni—MH), Lead-Acid, or other type of battery. In this regard, recharger 132 may correspond to a power refreshment system that provides charging through inductive charging, distant charging using infrared, distant charging using radio frequency, battery replacement during the operation, liquid metal battery refreshment, magneto-based charging, or other battery refreshment process. Recharger 132 may provide charge during the operation of mobile system 110, for example, as mobile system 110 travels between two or more points. Thus, battery 112 may be recharged during operation of mobile system 110 by recharger 132. Recharger 132 may be also be included on or more physical or wireless charging components for conveying a charge to battery 112, including plugs, ports, or other components used to connect with battery 112.

Mobile system 110 further includes a scheduling application 134 and at least one communication module 116 adapted to communicate with recharging coordinator platform 120. Scheduling application 134 may correspond to one or more processes to execute modules and associated specialized hardware of recharging coordinator platform 120 to receive charging schedule information for one or more of charging of one or more mobile systems and charge the mobile systems based on the information. In this regard, recharging coordinator application 1000 may correspond to specialized hardware and/or software to receive a schedule that indicates a time and/or location for charging of mobile system 110, which may further include a type of charging to provide to mobile system 110. The schedule may further include a travel route to a location to provide charging to mobile system 110 for use with a mobile charging pod. Additionally, the schedule may include additional travel information necessary to provide charge to other mobile systems, such as a point of operation for each of charging pods 130. In various embodiments, communication module 136 may include a DSL (e.g., Digital Subscriber Line) modem, a PSTN (Public Switched Telephone Network) modem, an Ethernet device, a cellular technology signal/network device (e.g., 3G, 4G, 5G, and/or other 3GPP-based cellular network), other a broadband device, a satellite device and/or various other types of wired and/or wireless network communication devices including microwave, radio frequency, infrared, Bluetooth, and near field communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 200.

Figure 3:
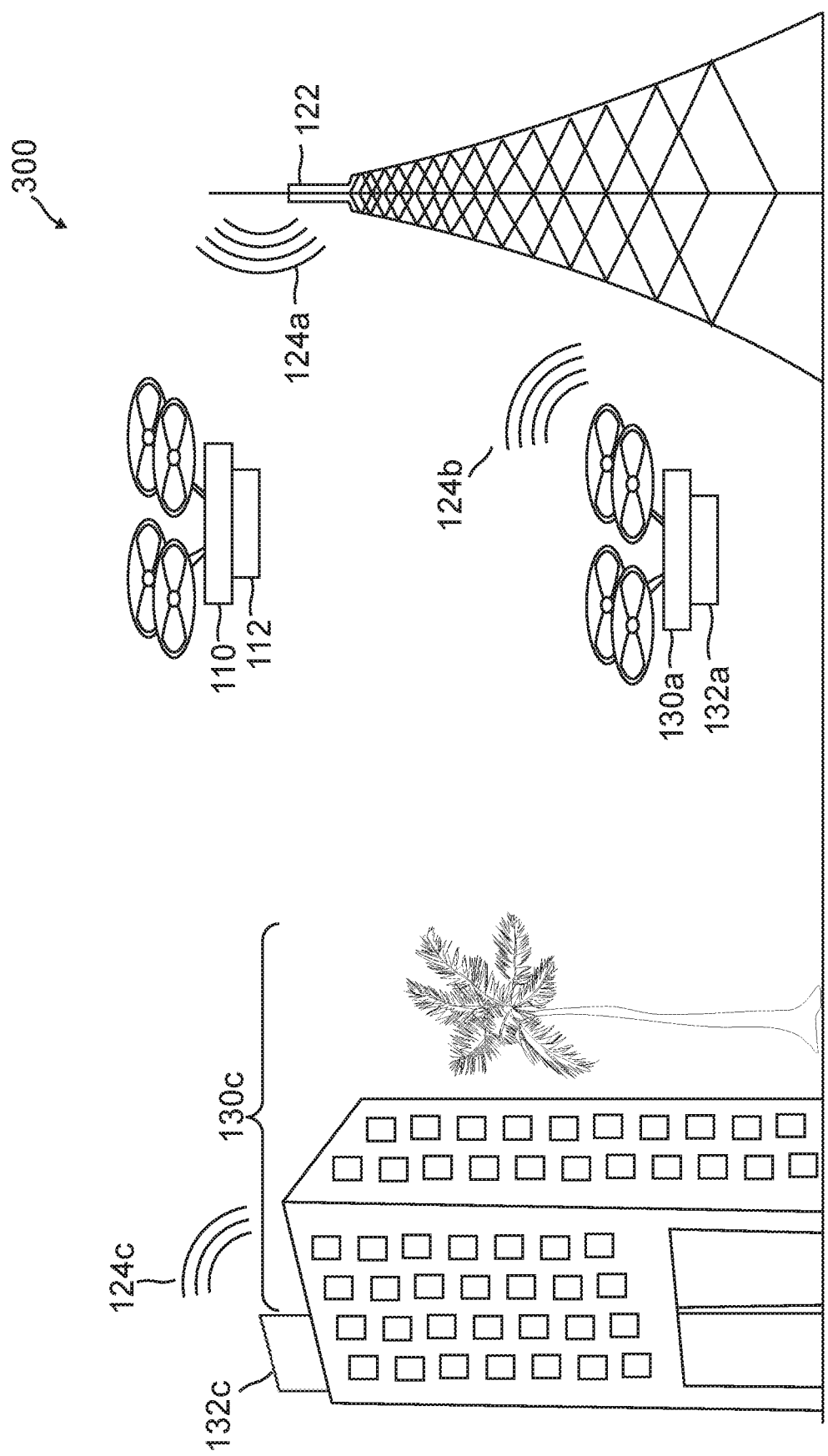
FIG. 3 illustrates an example of a platform providing instructions for mobile recharging of vehicles and robotics is provided, according to an embodiment.

FIG. 3 illustrates an example of a platform providing instructions for mobile recharging of vehicles and robotic devices is provided, according to an embodiment. Environment 300 of FIG. 3 includes mobile system 110 having battery 112, charging pod 120a, and charging pod 120c discussed in reference to network environment 100 of FIG. 1. Additionally, a base tower 122 corresponds generally to one of base stations 122a-c in network environment 100 of FIG. 1.

In various embodiments, environment 300 of FIG. 3 displays mobile system 110 in operation, such as travelling between two or more points. During operation of mobile system 110, battery 112 may be depleted during operation of mobile system 110. For example, mobile system 110 may be used to deliver a payload to a location, sense data, or otherwise operate based on instructions from a human or automated operator. During operation, battery 112 may require recharging to maintain operation of mobile system 110. Mobile system 110 may provide battery conditions, levels, and thresholds to a remote scheduler for charging pods 130a and 130c, such as recharging coordinator platform 120 in network environment 100 of FIG. 1. Additionally, the scheduler may further receive information necessary to determine whether battery 112 requires recharging, when battery 112 is expected to be depleted, and an effective coverage area of mobile system 110 based on the battery level of battery 112. Additional data to determine the battery conditions and predicted life may include current and/or expected weather, traffic, payloads, travel routes, type and/or length of operation (e.g., speed, destination, etc.), schedules for charging by one or more available charging pods, and other information discussed herein.

In order to provide charging through charging pods 130a and 130c, the scheduler may further receive data from one or more data detection resources capable of determining data and receiving communications associated with environment 300. For example, the data detection resources may detect the aforementioned data, such as current and/or expected weather and/or traffic patterns. The scheduler may further provide optimization algorithms and processes through a schedule optimizer that assists in generating schedules for charging pods 130a and 130c. The optimizer algorithms and processes may provide integration with a smart city and/or emergency relief system so that scheduling, resources, and traffic control capabilities of charging pods 130a and 130c may be optimized with other charging pods. This may include optimization of locations for charging, travel routes to provide charging, and resource usage and renewal of charging pods 130a and 130c. For example, traffic control optimization may allow for resource scheduling and prioritization based on service level agreements and business assurance policies and plans. Additionally, the platform may communicate with charging pods 130a and 130c through wireless transmissions 124a from base station 122 in order to provide traffic management, scheduling, and charging instructions. Moreover, charging pods 130a and 130c may communicate with the platform for these traffic control optimization processes through wireless transmissions 124b and 124c, respectively, in order to provide data utilized for traffic management, scheduling, and charging of mobile system 110.

Thus, during operation of mobile system 110, the scheduler may determine that battery 112 requires recharging at some time and location. The scheduler may be in communication with mobile system 110 and/or charging pods 130*a* and 130*c* in order to provide multi-mode remote charging for mobile system 110 during operation of mobile system 110. The multi-mode remote charging may provide charging through inductive coupling, distance charging through IR or RF, magneto-based charging and battery regeneration (including during flight or operation of mobile system 110), battery replacement, and/or battery refreshment (e.g., refreshment of liquid metal batteries). The scheduler may generate a schedule or queue for charging mobile systems by charging pods 130*a* and/or 130*c*, which may determine a time, location, and order of charging mobile systems, as well as one or more of the aforementioned processes for charging mobile system 110. The schedule may be based on when battery 112 is expected to be depleted, what pods are accessible by mobile system 110 prior to depletion of battery 112, a prioritization to charge mobile system 110 over other mobile systems, and other weights and parameters processed by the optimization processes of the scheduler.

Charging pod 130*a* may correspond to a mobile charging pod having a recharger 132*a* that provides charging of devices over an area and may be mobile to meet mobile system 110 at a location and time. Thus, charging pod 130*a* may travel to meet mobile system 110 once a schedule has been generated for charging pod 130*a*, and a time and location for charging battery 112 of mobile system 110 has been determined. Charging pod 130*a* may correspond to a manned or unmanned vehicle or platform that may travel over a distance based on instructions and provide charging over that distance using recharger 132*a*. Charging pod 130*a* may receive instructions through wireless transmissions 124*a* and may transmit data back from charging pod 130*a* through wireless transmissions 124*b*. Conversely, charging pod 130*c* is shown as a stationary charging pod, which may be placed at a location and/or attached to another object to provide charging at that specific location. For example, charging pod 130*c* may correspond to a charging pod displaced on a roof of a building so that flying drones may be recharged during operation. In other embodiments, charging pod 130*c* may instead correspond to its own location, such as a refueling and recharging station built specifically for providing battery recharging and other services at the location through recharger 132*c*. Charging pod 130*c* may receive instructions through wireless transmissions 124*a* and may transmit data back from charging pod 130*c* through wireless transmissions 124*c*.

The prioritization of using charging pod 130*a* over charging pod 130*c*, and vice versa, may be affected by specific battery conditions and prioritization of mobile system 110. For example, a service level agreement may restrict mobile system 110 to only utilizing charging pod 130*c* or other commitments may cause charging pod 130*c* to be selected, and vice versa.

In some embodiments, the payload may be time sensitive, such as an item that is required to be delivered at a certain time and/or an item that may be perishable (e.g., a human organ required for surgery, time sensitive documents, etc.). Thus, mobile system 110 may be prioritized to maintain its operation and receive recharging of battery 112 over other mobile systems that may be operating in environment 300. In this regard, mobile system 110 may receive recharging by charging pod 130*a* and/or charging pod 130*c* over these other systems and may be added to a top of a queue or moved up in the queue. In similar embodiments, mobile system may also serve a disaster, such as by maintaining communications for disaster relief personnel, providing imaging or data detection of the disaster, and/or assisting in disaster recovery or human assistance. In such embodiments, mobile system 110 may also be similarly prioritized and charging pods 130*a* and/or 130*c* may be designated to mobile system 110 solely or for recharging during operation based on the payload of mobile system 110 and/or the emergency communications received by the scheduler.

Figure 4:
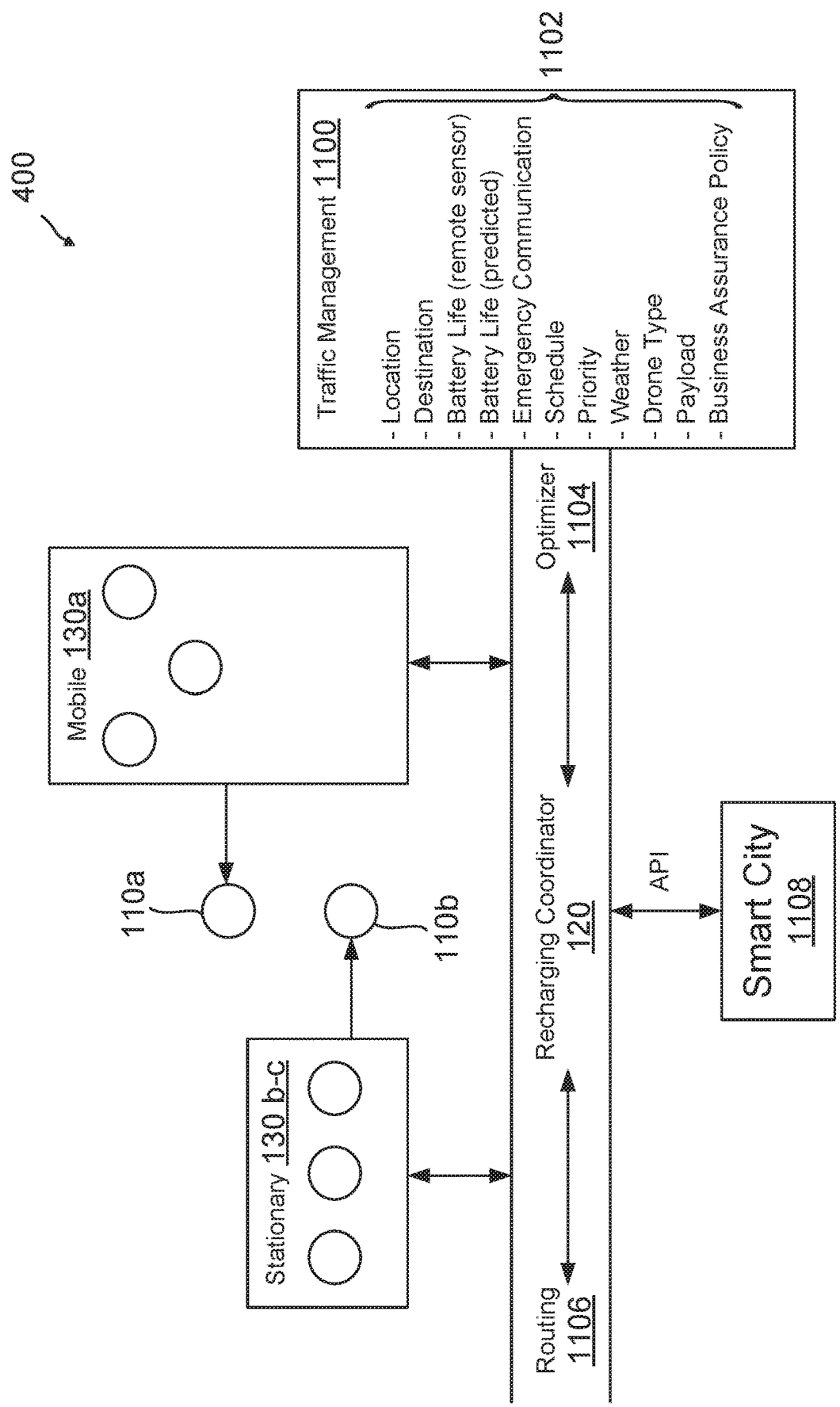
FIG. 4 illustrates a block diagram of a platform controlling traffic and recharging for stationary and mobile charging pods that provide mobile charging to systems, according to an embodiment.

FIG. 4 illustrates a block diagram of a platform controlling traffic and recharging for stationary and mobile charging pods that provide mobile charging to systems, according to an embodiment. FIG. 4 includes another representation of an artificial intelligence platform that provides coordination of charging pods and optimization of scheduling and traffic to provide recharging of mobile systems. In this regard, environment 400 similarly includes recharging coordinator platform 120 discussed in reference to FIGS. 1 and 2, which may coordinate use of charging pods 130*a-c* to charge mobile systems 110*a-b*.

During operation of mobile systems 110*a-b*, fuel resources and battery power may be depleted to a level where mobile systems 110*a-b* may risk inoperability during critical operations. This may adversely affect mobile systems 110*a-b* and/or other entities requiring use of mobile systems 110*a-b*. However, mobile systems 110*a-b* may receive recharging during use by charging pods 130*a-c* controlled and scheduled through recharging coordinator platform 120. Recharging coordinator platform 120 may implement traffic management 1100 to control charging pods 130*a-c* and provide recharging of mobile systems 110*a-b*. In this regard, traffic management 1100 may receive and process factors 1102, which correspond to factors used to assign, schedule, and optimize use of charging pods 130*a-c* for charging of mobile systems 110*a-b*. For example, factors 1102 include a location, a destination, a battery life from a remote sensor, a predicted battery life, an emergency communication, a schedule, priority for mobile systems 110*a-b*, weather, drone type for mobile systems 110*a-b*, payloads of mobile systems 110*a-b*, and/or business assurance policies covered by recharging coordinator platform 120. Factors 1102 may be different in different embodiments, and more, less, or different factors may be analyzed by recharging coordinator platform 120.

Utilizing traffic management 1100, recharging coordinator platform 120 may process factors collected by traffic management 1100 with an optimizer 1104 to perform routing 1106 of charging pods 130*a-c*. Optimizer 1104 may provide one or more optimization processes to determine proper routing 1106 that provides routes and schedules for charging mobile system 110*a-b* based on factors 1102 and additional data. Additionally, integration with a smart city 1108 may provide additional information necessary for optimizer 1104 to perform routing 1106. Routing 1106 may include navigation directions and charging instructions that may be utilized by mobile systems 110*a-b* and/or charging pods 130*a-c* to provide charging services to mobile systems 110*a-b*. For example, routing 1106 may direct mobile charging pod 130*a* from a pool of mobile pods to a location for mobile system 110*a* that causes or enables charging pod 130*a* to charge mobile system 110*a*. This may include executable processes to arrive at a location for mobile system 110*a* at a specific time. Mobile system 110*a* may also be instructed to arrive at the location at the time, and may receive instructions on how to charge using charging pod 130*a*. However, in other embodiments, routing 1106 may only be for charging pod 130*a* so that a charge is provided without requiring mobile system 110*a* to perform actions (e.g., during movement of mobile system 110*a*).

Similarly, routing 1106 may include instructions for causing or enabling stationary charging pods 130*b-c* to charge mobile system 110*b*. Since charging pods 130*b-c* are stationary, routing 1106 may include directions, queue order, time, and/or location information that assists mobile system 110*b* in visiting one or more of charging pods 130*b-c* to receive a charge. Routing 1106 for charging pods 130*b-c* and mobile system 110*b* may further include directions and instructions for mobile system 110*b* to utilize the charging features of charging pods 130*b-c*. Stationary ones of charging pods 130*a-c* may be selected for charging where available or based on factors 1102 and mobile one of charging pods 130*a-c* may be utilized where stationary pods are unavailable or may cause additional cost or incur loss due to use of stationary pods over mobile pods. Charging options for routing 1106 may be based on a least-cost option, schedule commitments of charging pods 130*a-c*, and/or service level agreements. Moreover, optimizer 1104 may further determine routing 1106 to provide a safest, fastest, and/or easiest route and/or schedule for charging mobile systems 110*a-b* using charging pods 130*a-c*. This may be done based on factors 1102 and other information, including comparisons of actual battery levels or remaining charge to predicted battery life. In some embodiments, premium services may also be provided to critical applications of mobile systems 110*a-b*, which may be utilized during emergencies, depending on weather or traffic, or otherwise required due to device/system malfunctions, payload and/or device usage requirements, etc. Additionally, recharging coordinator platform 120 may be utilized with a cellular network for communications with the components shown in environment 400. For example, communication module 116 may include an LTE transceiver module for implementing an LTE physical layer and LTE protocol stack, and/or any other 3G, 4G, and/or 5G transceiver module(s), and/or satellite network transceiver module(s), and/or other transceiver module(s) associated with other wireless protocols/applications.

While an example manner of implementing recharging coordinator platform 120 with charging pods 130*a-c* is illustrated in FIG. 4, one or more of the components (e.g., elements, processes, and/or devices) illustrated in FIG. 4 may be combined, divided, re-arranged, omitted, eliminated, and/or implemented in any other way. Further, the components of environment 400 in FIG. 4 may be implemented by hardware, software, firmware, and/or any combination of hardware, software, and/or firmware. Thus, for example, any of the components may be implemented by one or more analog and/or digital circuits, logic circuits, programmable processors, application specific integrated circuits (ASICs), programmable logic devices (PLDs), and/or field programmable logic devices (FPLDs). In this regard, when implemented using circuitry, the components of may be referred to as processing circuit, communication transceiver circuit, mobility controller circuit, and autonomous positioner circuit, respectively. When reading any claims as set forth herein to cover purely software and/or firmware implementations, at least one of the components is hereby expressly defined to include a tangible computer readable storage device or storage disk such as a memory, digital versatile disk (DVD), compact disk (CD), a Blu-ray disc™, and/or other storage device/disk storing the software and/or firmware.

Figure 5:
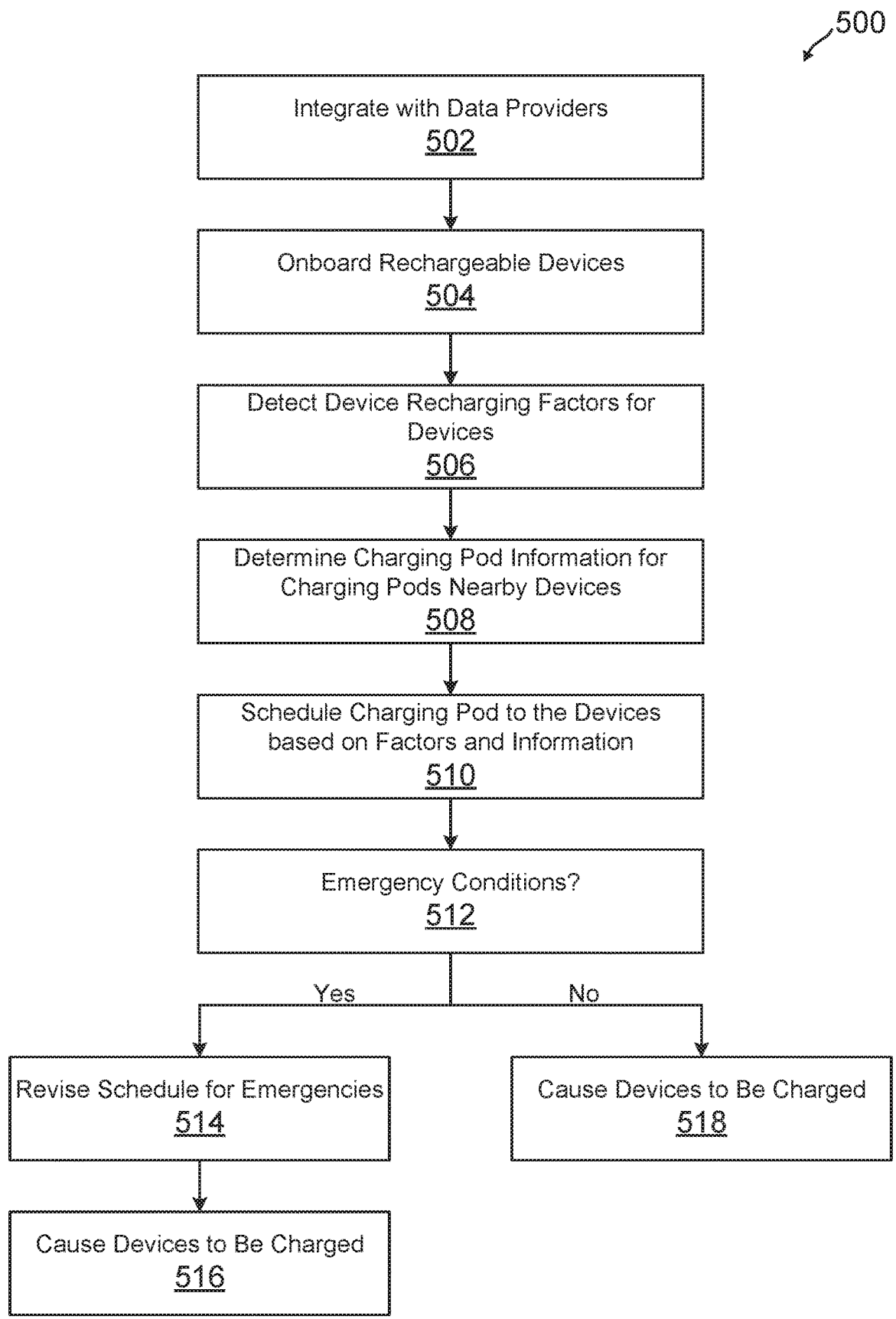
FIG. 5 illustrates a flow diagram for operating an artificial intelligence platform for mobile charging of rechargeable vehicles and robotics, according to an embodiment.

FIG. 5 illustrates a flow diagram for operating an artificial intelligence platform for mobile charging of rechargeable vehicles and robotic devices, according to an embodiment. Note that one or more steps, processes, and methods described herein in flowchart 500 may be omitted, performed in a different sequence, or combined as desired or appropriate.

At step 502, integration with data providers occurs for a scheduler and optimizer for a charging resource allocation and traffic controller of a recharging coordinator platform. Data providers may include established systems that may detect and determine data that may be used in planning and/or routing of charging pods provided by the platform, such as stationary charging pods at various locations that may be visited by mobile systems requiring charging and mobile charging pods that may be used to travel to locations of the mobile systems. For example, the data providers may correspond to a smart city system that detects weather, traffic, movement, geographic conditions, and other data over an area or region that may be used to schedule the charging pods. Other system integrations may include weather systems, traffic systems, or other systems that monitor data. Additionally, an emergency response system may expose data through an API of the system that allows the platform to detect and retrieve emergency communications. The emergency communications may be used to determine priority and scheduling of the charging pods. The emergency response system may also request or provide data that indicates one or more charging pods be specifically designated for an emergency, disaster, accident, or other cause that requires use of the charging pods to provide charging of other devices associated with the emergency and monitoring of the emergency and other devices during the emergency.

Rechargeable devices are onboarded with the recharging coordinator platform, at step 504. Onboarding of the devices may be performed to associate the devices with the platform so that the platform may monitor data of the rechargeable devices and determine when the devices require recharging. For example, onboarding of the rechargeable devices may be used to provide a communication identifier to the platform and other information necessary to monitor the device's battery life and determine when the battery is expected to be fully depleted, the device's effective coverage area with the remaining battery power, and/or a predicted life for the battery. After onboarding, at step 506, device recharging factors for the onboarded devices are detected. The device recharging factors may include information for mobile systems and/or charging pods, such as locations, destinations, battery life detected from a remote sensor, a predicted battery life, emergency communications, priorities for mobile systems, weather, drone type for the mobile systems, payloads of the mobile systems, and/or business assurance policies of the platform. Other factors for battery recharging may also be detected by the platform based on the system integrations and onboarded devices.

At step 508, charging pod information for charging pods nearby the devices is determined. The charging pod information may include schedules and requirements for the charging pods, such as whether the charging pods are assigned to specific mobile systems for recharging, when, where, and how (e.g., the charging process and resources used for charging) the charging pods are scheduled to charge the mobile systems, and other scheduling information. Charging pod information may also include information for resources and availability of recharging fuel or capacity for the charging pods, which may further be used to determine a schedule for the charging pods. Other information for the charging pods may also be determined, such as travel routes, usage by other devices, and/or assignment to certain emergencies or other situations that require the use of one or more charging pods. Based on the charging pod information and the device recharging factors, at step 510, charging pods are scheduled with the devices for recharging. The charging pods may be scheduled in order to optimize lowest cost, safety, traffic, time, and/or coverage of the charging pods to provide charging to mobile systems, such as by optimizing routing and use of charging pods and provide maximized coverage and resource allocation for charging. In some embodiments, the optimizer may also optimize usage of the charging pods based on other conditions.

In some embodiments, emergency conditions may be detected or determined after determining schedules for the charging pods, at step 512. For example, an emergency broadcast or communication system may be used to detect a natural disaster, accident, medical procedure requiring delivery of items, or other emergency scenario that requires immediate attention by one or more mobile systems, and thus charging of those mobile systems to ensure usage during the emergency. In other embodiments, the emergency condition may be recharging of a mobile system that has a higher priority or ranking for recharging than one or more of the mobile systems currently assigned to be charged in a schedule for the charging pod(s). If the emergency situation is detected, at step 514, the schedule for charging by the charging pod(s) is revised to accommodate charging of those mobile systems assisting with the emergency. This may include reassigning mobile systems to different charging pods, revising a location and/or time to charge mobile systems, removing and/or adding mobile systems to schedules, and/or revising orders of charging mobile systems within the schedules. Additionally, the charging pod(s) may assist with the emergency situation, for example, by providing charging processes, monitoring communications and/or sending/receiving communications for the emergency, and/or detecting or capturing data related to the emergency.

At step 516, the devices are recharged based on the revised schedule due to the emergency. However, if no emergency is detected, then at step 518, the devices are scheduled to be charged based on the originally generated schedule using the optimizer algorithms, processes, and detected data. The charging pods may provide multi-mode remote charging through one or more of inductive coupling, distance charging through IR or RF, magneto-based charging and battery regeneration (including during flight or operation of a mobile system), battery replacement, and/or battery refreshment (e.g., refreshment of liquid metal batteries). Moreover, the charging pods and/or mobile systems may include attachment and latching mechanisms to effectuate a charge, or may communicate to cause the charge to be provided (e.g., by identifying that the mobile system is within proximity to the charging pod and capable of receiving the charge). In some embodiments, the mobile system and the charging pod may communicate to travel together in proximity so that a charge may be provided during operation of the mobile system and the mobile system travels.

Figure 6:
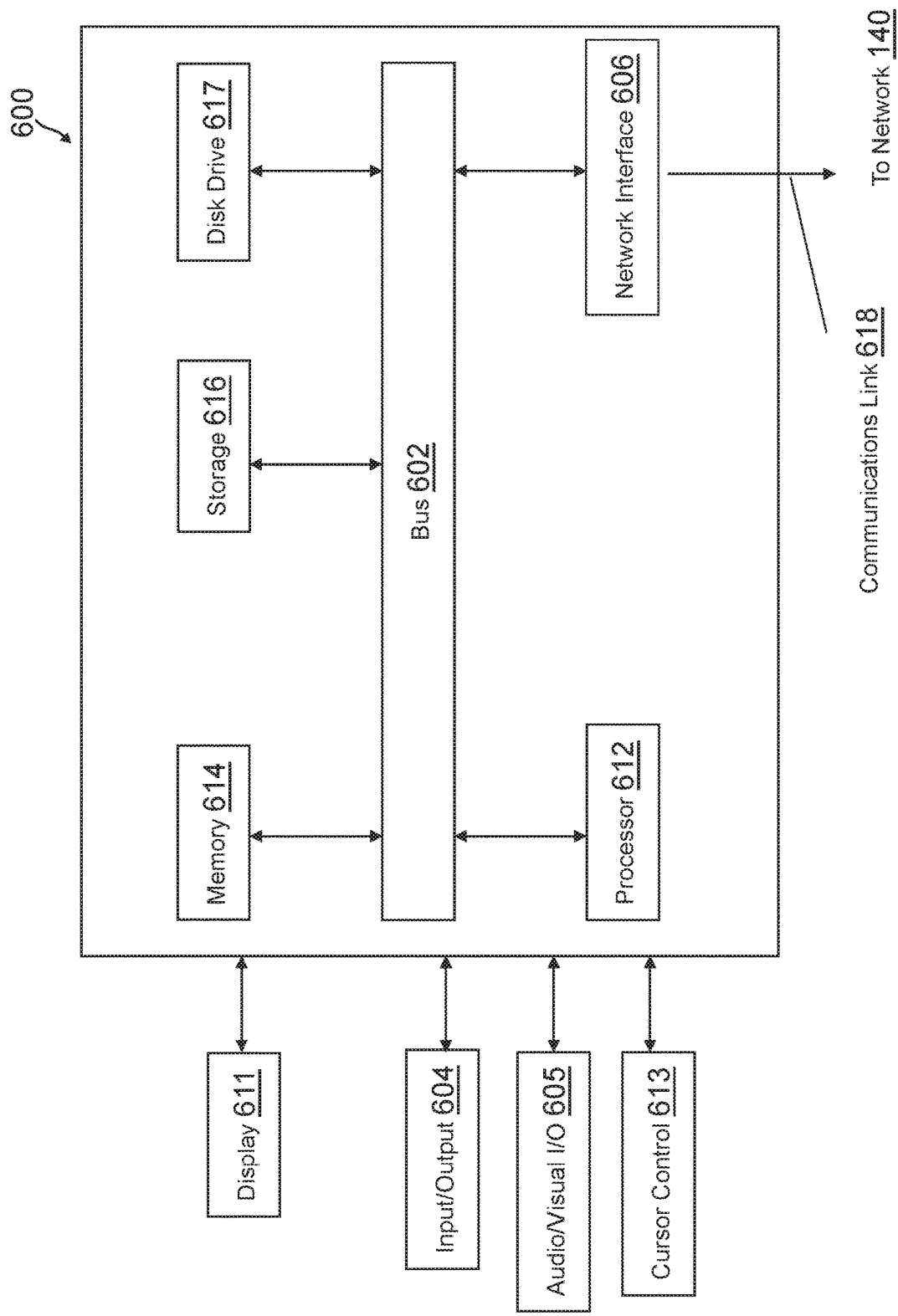
FIG. 6 illustrates a block diagram of an example of an electronic system with which one or more embodiments of the present disclosure may be implemented, according to an embodiment.

FIG. 6 illustrates a block diagram of an example of an electronic system with which one or more embodiments of the present disclosure may be implemented, according to an embodiment. In various embodiments, computer system 600 of FIG. 6 may comprise a personal computing device (e.g., smart phone, a computing tablet, a personal computer, laptop, a wearable computing device such as glasses or a watch, Bluetooth device, key FOB, badge, etc.) capable of communicating with the network. In other embodiments, a cellular network carrier or provider may utilize a network computing device (e.g., a network server) capable of communicating with the network similar to computer system 600. Moreover, one or more of the systems of a drone, electrical vehicle, or robotic may include and/or function similarly to computer system 600. It should be appreciated that each of the devices utilized by users and/or service providers (e.g., cellular network carriers) may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 140. In various embodiments, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In various embodiments, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A non-transitory machine-readable medium, comprising executable instructions that, when executed by a processor of a device, facilitate performance of operations, comprising:
   monitoring an operation of a mobile system;
   determining that the operation comprises the mobile system being designated a carrier of a priority item;
   detecting that the mobile system requires charging of a rechargeable battery during the operation;
   in response to the detecting, determining a location, a time, and a charging station of charging stations to charge the rechargeable battery at the location and the time based on the operation of the mobile system being designated the carrier of the priority item, and charging information for the charging stations, wherein the charging station is a mobile charging station;
   assigning the charging station to the mobile system to charge the rechargeable battery at the location and the time; and
   sending respective navigation instructions to the mobile system and the charging station for use by the mobile system and the charging station in arriving at the location at the time.

2. The non-transitory machine-readable medium of claim 1, wherein the charging stations perform battery recharging processes, and wherein the battery recharging processes comprise at least one of inductive charging, distant charging using an infrared signal, distant charging using a radio frequency signal, battery replacement during the operation, liquid metal battery refreshment, or magneto-based charging.

3. The non-transitory machine-readable medium of claim 1, wherein the charging stations comprise at least one of the mobile charging station or a stationary charging station, wherein the charging stations perform multi-mode charging processes with respect to the mobile system.

4. The non-transitory machine-readable medium of claim 1, wherein the charging information comprises at least one of locations of the charging stations, charging schedules for the charging stations, charging features of the charging stations, prioritization of the charging stations, emergency communications received for use of the charging stations, or available power for the charging stations.

5. The non-transitory machine-readable medium of claim 4, wherein detecting that the mobile system requires charging of the rechargeable battery is based on travel factors of the mobile system, and wherein the travel factors comprise at least one of a payload of the mobile system, a distance of travel of the mobile system, a travel route of the mobile system, a battery type of the rechargeable battery, current or predicted traffic for an area associated with the charging station and the mobile system, a destination of the mobile system, a predicted battery life of the rechargeable battery, a detected battery life of the rechargeable battery by a sensor, a service level agreement for the mobile system, or current or predicted weather encountered by the mobile system.

6. The non-transitory machine-readable medium of claim 1, wherein the operations further comprise:
   causing the charging station to charge the rechargeable battery at the location and the time.

7. The non-transitory machine-readable medium of claim 1, wherein the mobile system is monitored via a network, wherein the network comprises at least one of a third generation communication network, a fourth generation communication network, a long term evolution communication network, or a fifth generation communication network, and wherein the mobile system comprises at least one of a drone device, an electric vehicle, or a robotic device.

8. The non-transitory machine-readable medium of claim 1, wherein the charging station is a first charging station, and wherein the operations further comprise:
   based on an emergency requirement to charge the rechargeable battery prior to the first charging station charging the rechargeable battery at the location and the time, assigning a second charging station of the charging stations to charge the rechargeable battery, and causing the second charging station to charge the rechargeable battery prior to the first charging station charging the rechargeable battery.

9. The non-transitory machine-readable medium of claim 1, wherein the determining the charging station is further based on at least one factor of a group of factors, and wherein the group of factors comprises respective schedules of the charging stations applicable to charging mobile systems, a least cost of charging the mobile system by the charging station relative to other costs of charging the mobile system by other charging stations of the charging stations other than the charging station, scheduled power commitments of the charging stations, and a service level agreement applicable to the mobile system.

10. The non-transitory machine-readable medium of claim 1, wherein the mobile system is a first mobile system, and wherein the operations further comprise:

monitoring the charging stations to prevent a collision between at least one of the charging stations and at least one of the first mobile system or a second mobile system using at least one collision detection sensor.

11. A method, comprising:

determining, by a system comprising a processor, that a mobile vehicle is operating within a region;

determining, by the system, a designation of the mobile vehicle as a carrier of a priority item;

determining, by the system, that the mobile vehicle requires charging of a battery for the mobile vehicle while operating within the region;

identifying, by the system, a location, a time, and a charging station of a group of charging stations available within the region for charging of the battery at the time and the location based on the designation of the mobile vehicle as the carrier of the priority item and charging information for the group of charging stations, wherein the charging station is a mobile charging station; and sending, by the system, respective navigation instructions to the mobile vehicle and the charging station for use by the mobile vehicle and the charging station to arrive at the location at the time for the charging of the battery of the mobile vehicle.

12. The method of claim 11, wherein, prior to determining that the mobile vehicle requires the charging of the battery, the method further comprises:

accessing, by the system, at least one factor associated with the mobile vehicle, wherein the at least one factor comprises at least one of current or predicted weather within the region, a payload of the mobile vehicle, an operational condition of the mobile vehicle, current or predicted vehicle traffic within the region, a travel route of the mobile vehicle, or a predicted battery life of the battery.

13. The method of claim 11, wherein, prior to determining that the mobile vehicle is operating within the region, the method further comprises:

communicating, by the system, with network equipment via a network associated with the region, wherein the network comprises at least one sensor that monitors information for the region, and wherein identifying the charging station is further based on the information for the region.

14. The method of claim 11, wherein, prior to determining that the mobile vehicle is operating within the region, the method further comprises:

communicating, by the system, with network equipment via an emergency network that is authorized to manage the mobile vehicle; and receiving, by the system, a request to monitor the mobile vehicle from the network equipment.

15. A system, comprising:

a processor; and a memory that stores executable instructions that, when executed by the processor, facilitate performance of operations, comprising:

receiving, via an emergency communication network, a designation of a mobile system as a carrier of a priority item;

receiving battery power information for the mobile system;

determining a time and a location to recharge the mobile system using a charging pod, which is one of charging pods, based on the designation of the mobile system as the carrier of the priority item, the battery power information, and pod information for the charging pods, wherein the charging pod is a mobile charging pod;

generating respective travel routes for the mobile system and the charging pod to arrive at the location at the time to enable recharging of the mobile system using the charging pod based on traffic information for an area of charging coverage enabled by the charging pods; and sending the respective travel routes to the mobile system and the mobile charging pod.

16. The system of claim 15, wherein the charging pods provide battery recharging processes, and wherein the battery recharging processes comprise at least one of inductive charging, distant infrared charging, distant radio frequency charging, battery replacement, liquid metal battery refreshment, or magneto-based charging.

17. The system of claim 15, wherein the pod information comprises at least one of current locations of the charging pods, routing information from mobile charging pods of the charging pods, charging schedules for the charging pods, weather information for the area of charging coverage, types of the charging pods, or service level designations corresponding to the charging pods.

18. The system of claim 15, wherein the charging pods comprise a stationary charging pod and the mobile charging pod, and wherein directing the mobile system to be recharged comprises one of:

directing the mobile system to the stationary charging pod at the location; or directing the mobile charging pod to the mobile system at the location.

19. The system of claim 15, wherein the operations further comprise:

determining the traffic information comprising determining current or predicted traffic information in the area of charging coverage based on communications with network equipment associated with the area of charging coverage, wherein the communications allow access, by the system, to sensors communicatively coupled to the system and associated with the area of charging coverage.

\* \* \* \* \*